United States Patent
Hodge

(10) Patent No.: US 10,366,599 B1
(45) Date of Patent: *Jul. 30, 2019

(54) COMMUNICATION DEVICES FOR GUARDS OF CONTROLLED ENVIRONMENTS

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,957

(22) Filed: Sep. 15, 2017

(51) Int. Cl.
*G08B 25/10* (2006.01)
*H04W 4/029* (2018.01)
*G08B 21/02* (2006.01)

(52) U.S. Cl.
CPC .......... *G08B 25/10* (2013.01); *H04W 4/029* (2018.02); *G08B 21/02* (2013.01)

(58) Field of Classification Search
CPC combination set(s) only.
See application file for complete search history.

(56) References Cited

U.S. PATENT DOCUMENTS

| 2013/0214925 | A1* | 8/2013 | Weiss | G08B 25/001 340/539.11 |
| 2017/0124836 | A1* | 5/2017 | Chung | H04W 4/90 |
| 2017/0312556 | A1* | 11/2017 | Smith | A62B 18/08 |
| 2018/0018861 | A1* | 1/2018 | Locke | G08B 13/19656 |

* cited by examiner

*Primary Examiner* — Travis R Hunnings
(74) *Attorney, Agent, or Firm* — Sterne, Kessler, Goldstein & Fox P.L.L.C.

(57) ABSTRACT

The present disclosure provides details of a system and method for a communication device for guards in controlled environments. The communication device is established based on an indoor wireless infrastructure in the controlled environment, receiving wireless positioning signals to calculate and determine the real-time location of a user carrying the device. The indoor wireless positioning can be combined with other available positioning methods to provide highly accurate positioning information of the guard. The communication device detects, monitors, and records activities of the guard during a period of time, and is controlled by the control center. The control center and the communication device respond quickly to different abnormal situations. In addition, the communication device detects contraband electronic devices and monitor surroundings of the guard. Thus, the disclosed system and method for the communication device provides improved communication and monitoring for guards in a controlled environment.

17 Claims, 9 Drawing Sheets

US 10,366,599 B1

COMMUNICATION DEVICES FOR GUARDS OF CONTROLLED ENVIRONMENTS

BACKGROUND

Field

The disclosure relates to a system and method for communication devices for guards of controlled environments.

Background

In a controlled environment, staff/guards constantly need to go on different assignments which places the staff/guards at locations with limited communication with the control center of the controlled environment, or in situations where staff/guards have difficulties responding quickly to potential danger. In some situations, activities of guards lack monitoring, giving some staff/guards the opportunity to get involved in importation of contraband goods into the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
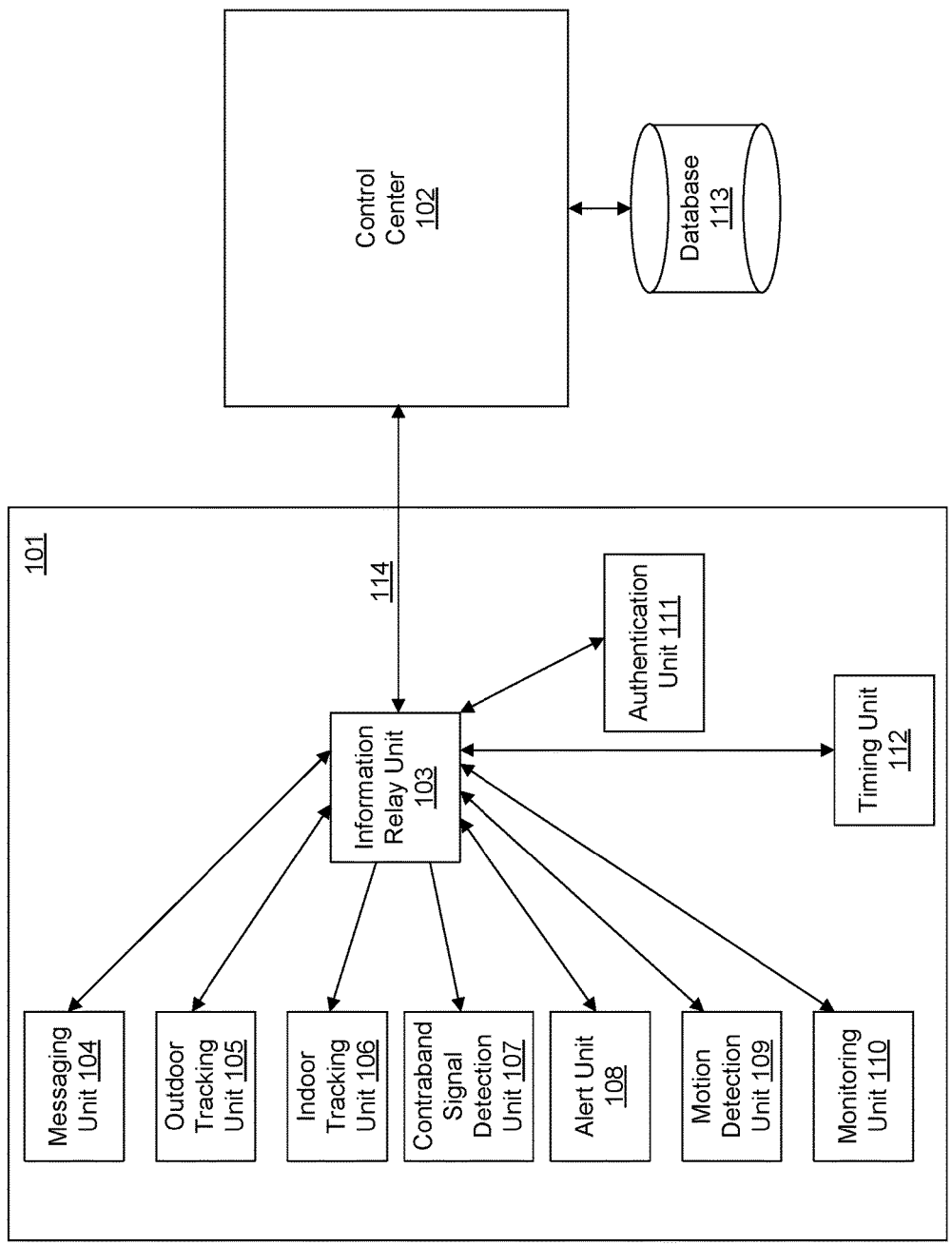
FIG. 1 illustrates a block diagram of a communication system for guards of a controlled environment, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

With conventional monitoring and communication system for a controlled environment, it is sometimes difficult for a control center of the controlled center to effectively communicate with and monitor staff/guards (hereinafter "personnel") during an assignment. As a result, personnel is in danger, and importation of contraband goods occurs. Meanwhile, smart devices utilized in a controlled environment allow users to stay in constant contact with the control center of the controlled environment. The use of these devices would offer many other features and functions that would prove beneficial to the users and jurisdictions.

The present disclosure provides details of a system and method for a communication device for guards in a controlled environment. The communication device is established based on an indoor wireless infrastructure in the controlled environment, receiving wireless positioning signals to calculate and determine the real-time location of a user carrying the device. The indoor wireless positioning can be combined with other available positioning methods, e.g., GPS positioning, to provide highly accurate positioning information of the user. The communication device detects and records activities of the user during a period of time, and is controlled by the control center. The status of user is monitored by control center. The control center and the communication device respond quickly to different situations. In addition, the communication device detects contraband electronic devices and monitors surroundings of the user. Thus, the disclosed system and method for the communication device provides improved communication and monitoring for users in a controlled environment.

Communication System for Guards of Controlled Environments

FIG. 1 illustrates a block diagram of a communication system 100 for guards of a controlled environment, according to embodiments of the present disclosure. Communication system 100 allows activities of guards to be tracked and monitored in real-time, facilitates real-time communications between guards and a control center, and automatically triggers a plurality of functionalities when the monitored activities are determined to be abnormal.

In various embodiments of the present disclosure, "abnormal" is determined as an activity/action/status, being monitored, satisfying certain criterion/criteria defined by system 100. Communication system 100 stores a set of criteria defining whether a monitored activity is determined as "normal" and "abnormal." For example, the set of criteria includes the time range to complete an assignment, the designed path for an assignment, the dwelling time at one location, the heart rate range, the regular presence locations of inmate, etc. Monitored activities fail to satisfy the criteria are determined to be "abnormal" by communication system 100. In various different embodiments, communication system 100 determines abnormal activities for different monitored activities. Details can be referred to in the description below.

In an embodiment, communication system 100 includes a multi-functional platform 101 and a control center 102, connected or coupled through connection link 114. Multi-functional platform 101 includes an information relay unit 103, a messaging unit 104, an outdoor tracking unit 105, an indoor tracking unit 106, a contraband signal detection unit 107, an alert unit 108, a motion detection unit 109, a monitoring unit 110, an authentication unit 111, and a timing unit 112. In one embodiment, communication system 100 further includes a database 113, connected to control center 102. Multi-functional platform 101 is arranged in a controlled environment. In an embodiment, control center 102 is arranged inside the controlled environment. In another embodiment, control center 102 is arranged outside the controlled environment, e.g., at a remote location. In operation, multi-functional platform 101 sends various data reflecting the status of guards to control center 102 to be processed and analyzed. Accordingly, control center 102 determines the guards' status or activities based on the received data and sends corresponding responses to multi-functional platform 101 to be executed.

In an embodiment, control center 102 includes any suitable software and hardware that facilitate communication between a monitoring user, e.g., staff or jurisdiction officer, and a monitored user, e.g., a guard, staff, or officer in the controlled environment. In an embodiment, control center 102 is further connected to workstations (not shown) or other computer systems/networks (not shown) for addition operations. Control center 102 includes software and hardware for displaying real-time status of a guard in the controlled environment, based on received signals. For example, control center 102 is displays a map of the control environment and the status and location of monitored users in the map.

In various embodiments, control center 102 displays the path, moving speed, dwelling time, body motion, and/or heart rate of a guard. In an embodiment, control center 102 is installed with software for remotely controlling the parts and functions multi-functional platform 101. For example, a user at control center 102 turns on and off certain units, e.g., the monitoring unit 110 of multi-functional platform 101, at a desired time. In an embodiment, control center 102 includes hardware and software for receiving and transmitting inputs from monitored user in the control environment and monitoring user at control center 102. For example, control center 102 includes a messaging program for the users to communicate in type-in messages or voice messages. In an embodiment, control center 102 includes software and hardware for receiving and playing audio/video data from multi-functional platform 101. For example, in an embodiment, control center 102 includes a speaker and a microphone so that a guard and a user at control center 102 have real-time conversations. In case of an abnormal activity received from multi-functional platform 101, control center 102 plays an alert through the speaker. The alert includes any suitable pre-recorded messages for attracting the attention of the audience. In various embodiments, control center 102 is installed with software for recording various information of each monitored user. For example, control center 102 records moving path, moving speed, dwelling time, body motion, heart rate, conversations, messages, and/or recorded images/videos associated with each monitored user. In various embodiments, control center 102 has the authority to monitor any information forwarded by information relay unit 103.

In various embodiments, abnormal activities that trigger responses of control center 102 include the path of the monitored user deviating from a designed path, monitored user not responding to an inquiry within a certain period of time, monitored user having a sudden body motion, monitored user having a sudden heart rate increase, monitored user failing to complete an assignment within a certain period of time, monitored user sending an alert, detection of contraband wireless signals, detection of abnormal presence of inmates, etc.

In an embodiment, database 113 stores any suitable data that can be used for the communication and monitoring functions of control center 101. For example, database 113 stores biometric data and identification data of the users, a map of the control environment, designed paths for monitored users, coordinates of certain locations and objects, reference data for positioning, criteria for determining "abnormal" and "normal" status/activities/actions, conversation history and messages associated with the monitored users, etc. For example, biometric data include voice samples, fingerprints, retina samples, and/or facial structures associated with a monitored or monitoring user. Identification data include legal name, birthday, social security number (SSN), and/or PIN number associated with a monitored or monitoring user. The map of the control environment includes coordinates of the boundaries of rooms, areas, walls, and/or names and restrictions of each room/area. Designated paths for monitored users define, e.g., areas, paths, dwelling times, assignment completion time, and/or moving directions a monitored user is expected to follow in an assignment. Reference data for determining the location or proximity includes, e.g., coordinates of positioning signal transmitters and positioning signal strength in the proximity of the signal transmitters. Criteria for determining which status are "normal" includes a set of ranges in, e.g., time, distance, location, path, moving speed, and body condition, during an assignment or a certain period of time, for limiting the activities of the monitored user. "Abnormal" status refers to these status failing to satisfy the criteria. For example, it is determined the monitored user following the designed path being "normal," and a deviation from the designed path is determined to be "abnormal." Conversation history and messages associated with a monitored user include the conversation history and messages recorded during an assignment in the control environment. In various embodiments, control center 102 also includes a display unit for displaying status of one or more monitored users, a user input device for receiving commands/selections from a monitoring user, etc.

In an embodiment, control center 102 simulates real-time activities of a monitored user based on data stored in database 113 and signals/data sent by multi-functional platform 101. For example, control center 102 extracts coordinates information from database 113 to generate a map of controlled environment, simulating/calculating the path, moving speed, and/or dwelling times of the monitored user in the map based on the real-time data received by multi-functional platform 101. A monitoring user is directly observes and monitor the activity of a monitored user. In various embodiments, control center 102 also simulates other detectable objects/subjects in real-time in the map. For example, based on data/signals sent by multi-functional platform 101, control center 102 also simulates the presence and status of inmates wearing/carrying certain signal-transmitting tags, e.g., radio frequency (RF) ID tags, and/or any devices transmitting a suitable detectable signal, e.g., a kiosk or a vending machine. The detectable objects/subjects are also displayed in the map to the monitoring user. In an embodiment, control center 102 also sends calculated path, moving speed and path to respond based on the activities. For example, control center 102 determines whether any abnormal activities occurred based on the calculation result, and/or respond accordingly based on the abnormal activities.

In an embodiment, control center 102 responds to data/signals sent by multi-functional platform 101. Control center 102 is programmed to respond to different inquiries from multi-functional platform 101 and extract necessary data from database 113 for the responses. Control center 102 directly responds to some signals/data, e.g., emergency calls/alerts. A monitoring user has the option to manually interrupt and respond to some signals/data through control center 102. In some embodiments, a monitoring user is required to authenticate his/her identity before interrupting the operations of control center 102. Decisions made by control center 102 are transmitted to information relay unit 103 through connection link 114 and implemented in designated units of multi-functional platform 101. In various embodiments, control center 102 responds to inquiries such as detection of abnormal activities of the monitored user, detection of contraband wireless signals, and/or messages/alerts/video streams/images sent by the monitored user. Response of control center 102 to the inquiries includes starting certain monitoring functions of multi-functional platform 101, sending alerts/alerts to one or more monitored users, etc. In some embodiments, control center 102 records the activities during a certain period of time or assignment and analyze the recorded history if necessary. For example, conversation or messages of a monitored user can be recorded, parsed, and/or analyzed.

Control center 102 is bi-directionally connected to multi-functional platform 101 through connection link 114. Connection link 114 includes any suitable wired (e.g., Ethernet) connection or wireless connection. The wireless connection can be implemented as one or more of a wide-area network (WAN) connection, a local area network (LAN) connection, the Internet, a Bluetooth connection, and/or an infrared connection. Other types of implementations for a wired or wireless connection are possible without deviating from the scope of the present disclosure. Control center 102 has the authority to control the functioning of various units in multi-functional platform 101.

Information relay unit 103 is bi-directionally connected to control center 102. Information relay unit 103 includes hardware and software to receive various data/signals from other units in the multi-functional platform 101 and forward the received data/signal to control center 102, and receive signals/data from control center 102 and distribute the signals/data to proper units. In some embodiments, information relay unit 103 is configured to determine the proper data to be sent to control center 102. For example, when both indoor tracking unit 106 and outdoor tracking unit 105 both send tracking or positioning information to information relay unit 103, information relay unit 103 determines which tracking information is appropriate to be forwarded to control center 102 based on the actual location of the monitored user. In an example, information relay unit 103 determines the actual location of the monitored user based on the received tracking information from indoor tracking unit 106 and outdoor tracking unit 105 and sending the tracking information that more precisely reflects the actual position/status of the monitored user. In an example, when information relay unit 103 determines the monitored user is located in the indoor environment of the control environment, information relay unit 103 only sends the tracking information from indoor tracking unit 106; when information relay unit 103 determines the monitored user is located in the outdoor environment of the control environment, information relay unit 103 only sends the tracking information from outdoor tracking unit 105. In some embodiments, information relay unit 103 sends tracking information from both indoor tracking unit 106 and outdoor tracking unit 105 to control center 102. In various embodiments, information relay unit 103 encrypts information sent to control center 102 and decrypting information sent by control center 102.

Messaging unit 104 is bi-directionally connected to control center 102 and includes software and hardware to facilitate texting/messaging functions between the monitored user and control center 102. In an embodiment, the messages transmitted between multi-functional platform 101 and control center 102 are in various forms such as text messages, videos, images, audio messages, and/or real-time video streams. The monitored user has the option to enter desired text and/or audio, take pictures and/or record videos, or stream videos. The various forms of messages are sent to control center 102 through information relay unit 103. In an embodiment, messaging unit 104 also enables texting/messaging functions among different monitored users. A monitored user has the option to select a desired recipient and the various forms of messages are redirected to the selected recipient by control center 102. A monitoring user at control center 102 has the authority to monitor any messages forwarded by information relay unit 103.

Outdoor tracking unit 105 is bi-directionally connected to control center 102 through information relay unit 103 and includes software and hardware to enable the tracking of a monitored user when the monitored user is in an environment, e.g., outdoor environment, of the control environment, where outdoor positioning signals are available. In an embodiment, outdoor tracking unit 105 includes a global positioning system (GPS) receiver. In some other embodiments, other GPS-based positioning means or other positioning systems are also used alone or in combination with GPS. Outdoor tracking unit 105 determines the locations of one or more monitored users in real-time. Outdoor tracking unit 105 periodically sends coordinates of the monitored users to information relay unit 103, and information relay unit 103 determines whether the coordinates are to be sent to control center 102.

Indoor tracking unit 106 is bi-directionally connected to control center 102 through information relay unit 103 and includes software and hardware to enable tracking of a monitored user when the monitored user is in an environment, e.g., indoor environment of the control environment, where indoor positioning signals are available. Indoor tracking unit 106 periodically sends location-reflecting signals/data to information relay unit 103. In an embodiment, indoor tracking unit 106 includes one or more of any suitable wireless positioning facilities such as radio frequency (RF)-based positioning systems, Bluetooth-based positioning systems, WiFi-based positioning systems, and/or ultrasound-based positioning systems. For example, the RF-based positioning system includes a RFID reader and a plurality of RFID tags/beacons distributed in the indoor environment. The RFID reader, carried by the monitored user, reads information stored in the nearby RFID tags and send the read-out information to information relay unit 103. In another example, the WiFi-based positioning system includes a WiFi-signal reader and a plurality of access points. The WiFi-signal reader receives WiFi signals from access points and sends the detected WiFi signals to information relay unit 103. In another example, a Bluetooth-based positioning system includes a Bluetooth-signal reader and a plurality of Bluetooth beacons. The Bluetooth-signal reader receives the Bluetooth signals and sends the detected Bluetooth signals to information relay unit 103.

In an embodiment, information relay unit 103, based on received signals/data from outdoor tracking system 105 and indoor tracking system 106, determines which signals/data are to be sent to control center 102. For example, when signals/data sent by outdoor tracking system 105 are weak or not available, information relay unit 103 determines the monitored user is in an indoor environment of the controlled environment and sends the signal/data from outdoor tracking system 105 to control center 102; when signals/data sent by indoor tracking system 106 are weak or not available, information relay unit 103 determines the monitored user is in an outdoor environment of the controlled environment and sends the signal/data from indoor tracking system 106 to control center 102. Information relay unit 103 has the ability to determine which signals/data are to be sent to control center 102 based on certain criteria, e.g., signal strength and signal availability. In some other embodiments, information relay unit 103 sends signals/data from both outdoor tracking unit 105 and indoor tracking unit 106 to control center 102. In some embodiments, information relay unit 103 switches between an "outdoor mode" and an "indoor mode", based on the received signals/data. In the outdoor mode, only the outdoor tracking function is available, and in the indoor mode, only the indoor tracking function is available.

After control center 102 receives the tracking signals/data from information relay unit 103, control center 102 simulates the location/position of the monitored user in the map of the controlled environment based on the received signals/data. Because control center 102 periodically receives real-time tracking signals/data, the simulation reflects the real-time status, e.g., path, location, movement, and/or dwelling time of the monitored user. Control center 102 has the option to utilize certain reference data stored in database 113 to calculate the location of the monitored subject. For example, when the monitored subject is in an indoor environment, control center 102 determines the location of a monitored user based on reference signal strength data and signal attenuation information. Control center 102 also includes suitable algorithm or model stored in database 113 to detect whether the status of the monitored user is abnormal, e.g., monitored user deviating from designed path, monitored user staying at a certain location for an abnormally long time, monitored user having a sudden body motion, and so on. Control center 102 responds to an abnormal status by triggering an alert or other actions.

Contraband signal detection unit 107 is bi-directionally connected to control center 102 through information relay unit 103 and includes hardware and software to detect unknown or forbidden wireless signals. Contraband signal detection unit 107 is configured to detect any wireless signals, e.g., WiFi hot spots, Bluetooth signals, and/or RF signals, not recognized or forbidden by multi-functional platform 101 or control center 102. For example, contraband signal detection unit 107 includes one or more wireless signal detectors that scan a wide range of signal frequencies, e.g., RF frequencies or cellular frequencies, to detect any unknown or forbidden wireless signals. Contraband signal detection unit 107 sends frequencies of detected signals to information relay unit 103. In one embodiment, information relay unit 103 forwards the received detected wireless signals to control center 102, and control center 102 compares the detected wireless signals to known and allowed wireless signals to determine whether contraband wireless signals are contained in the detected wireless signals. If a contraband wireless signal is detected, control center 102 sends a message or alert to inform the monitored user a contraband frequency has been detected and prompt the monitored user to search for the contraband device.

Alert unit 108 is bi-directionally connected to control center 102 and includes software and hardware for alerting the monitored user or control center 102. In an embodiment, a monitored user has the option to trigger alert unit 108 so that control center 102 receives an alert from the monitored user. In another embodiment, control center 102 triggers alert unit 108 so that one or more monitored users receive the alert. An alert can be in the form of alarms, text messages, audio messages, etc.

Motion detection unit 109 is bi-directionally connected to control center 102 and includes software and hardware to detect sudden body motions of a monitored user. Motion detection unit 109, including one or more motion sensors, sends a motion signal to control center 102 through information relay unit 103 when a sudden body motion of a monitored user is detected. Control center 102 sends a confirmation message to the monitored user. In an embodiment, if the monitored user responds to the confirmation message in a defined time period, the motion signal is disregarded; if the monitored user fails to respond to the confirmation message in the defined time period, control center 102 triggers other actions such as sending an alert to other monitored users informing the location of the monitored user failing to respond to the confirmation message. The confirmation message can be in the form of alert, text messages, audio messages, etc.

Monitoring unit 110 is bi-directionally connected to control center 102 and includes software and hardware to monitor activities of the monitored user. Monitoring unit 110 includes at least recording abilities, e.g., using cameras and/or microphones, to stream or record at a desired time. In an embodiment, the monitored user has the option to turn on the monitoring unit 110 to record a video. In an embodiment, control center 102 has the option to, e.g., when an abnormal status is detected, turn on monitoring unit 110 to start recording video and/or voice. In some embodiments, monitoring unit 110 can be turned off from both multi-functional platform 101 and control center 102. In some other embodiments, monitoring unit 110 cannot be turned off from multi-functional platform 101 when it is turned on from control center 102. In an embodiment, the monitored user has the option to locally store recorded content, e.g., video and/or audio data, or stream the recorded content in real-time to control center 102 through information relay unit 103. In another embodiment, control center 102 controls whether recorded content is to be locally stored or streamed. In some embodiments, monitoring unit 110 also monitors heart rate and/or voice pitch of the monitored user and periodically sending heart rate data and voice data to control center 102 through information relay unit 103. Control center 102 periodically compares the heart rate data and voice data to pre-recorded normal heart rate data and voice data, e.g., stored in database 113, to determine whether these data deviates from normal data. If control center 102 determines these data to be abnormal, control center 102 performs actions such as sending an alert to other monitored users and start video streaming from multi-functional platform 101.

Authentication unit 111 is bi-directionally connected to control center 102 and includes software and hardware to authenticate the identity of the monitored user. In an embodiment, authentication unit 111 prompts the monitored user to enter his/her identity-related information, such as PIN, SSN, legal name, and/or certain biometric samples, e.g., voice sample and retina scan sample, before allowing the monitored user to log in to multi-functional platform 101 and perform any assignment using multi-functional platform 101. Information relay unit 103 sends the received identity-related information to control center 102 so that control center 102 verifies entered identity-related information with pre-recorded information stored in database 113. The monitored user is given the option to attempt identity-related information a plurality times before control center 102 locks him/her out. When authentication fails, the monitored user needs to verify his/her identity and reactivate the locked multi-functional platform 101 at control center 102 or other authorized personnel. In some embodiments, a monitored user needs to re-identify himself/herself for certain assignments. For example, the monitored user is required to re-authenticate his/her identity in multi-functional platform 101 before him/her can send messages, alerts, and detect contraband wireless devices. The specific authentication methods for each assignment can be same or different, depending on, e.g., the convenience and reliability of different authentication methods.

Timing unit 112 is bi-directionally connected to control center 102 and includes software and hardware to record time elapsed and/or remained for an assignment/action. In an embodiment, timing unit 112 includes a clock or a timer. The monitored user or control center 102 has the authority to start counting time when an assignment, e.g., a walking and observing process, begins and stop counting time when the assignment finishes. If the monitored user does not finish the assignment on time, timing unit 112 sends an overdue signal to control center 102 through information relay unit 103, and control center 102 sends an alert to other monitored users or a confirmation message to the monitored user. In various embodiments, timing unit 112 also runs in the background for other functions. For example, when control center 102 sends an inquiry, e.g., text messages, confirmation message, and/or alert, to monitored user, timing unit 112 starts counting time elapsed for the inquiry and periodically sends time information to control center 102. If monitored user does not reply to the inquiry, control center 102 sends an alert to other monitored users or start video streaming from multi-functional platform 101. In various embodiments, real time and/or time elapsed/remained of an assignment are displayed to the monitored user.

In some embodiments, the bi-directional connection between units in the present disclosure includes any suitable bi-directional wired (e.g., Ethernet) connection or wireless connection. The wireless connection can be implemented as one or more of a wide-area network (WAN) connection, a local area network (LAN) connection, the Internet, a Bluetooth connection, an RF connection, and/or an infrared connection. Other types of implementations for a wired or wireless connection are possible without deviating from the scope of the present disclosure.

In various embodiments, at least some functions of control center 102 can be integrated or replicated into multi-functional platform 101. In an embodiment, information relay unit 103 is connected to or includes a control unit (not shown) and an internal database (not shown) similar to control center 102 and database 113. Control unit extracts data from the internal database and perform certain functions in response to received signals/data. For example, control unit determines to trigger an alert to control center 102 when the monitored user fails to reply to a message in a predetermined time period. In another example, multi-functional platform 101 stores a map of the controlled environment, and control unit determines to trigger an alert to control center 102 when the monitored user's path deviates from the designed path. In certain embodiments, some functions are executed on multi-functional platform 101 and other functions are executed through control center 102. The actual allocation of work load or functions between multifunctional platform 101 and control center 102 are subjected to different design requirements and preferences.

For illustrative purposes, in the present application, only one multi-functional platform 101 is shown for the description of communication system 100. In various different embodiments, control center 102 can also be connected to a plurality of multi-functional platforms 101 and facilitate communication among different multi-functional platforms 101. In an example, inquiries from one multi-functional platform 101 is routed by control center 102 to a desired receiving multi-functional platform 101. Control center 102 monitors the communication among all connected multifunctional platforms 101 and controls all connected multifunctional platforms 101.

Multi-Functional Platform

Figure 2:
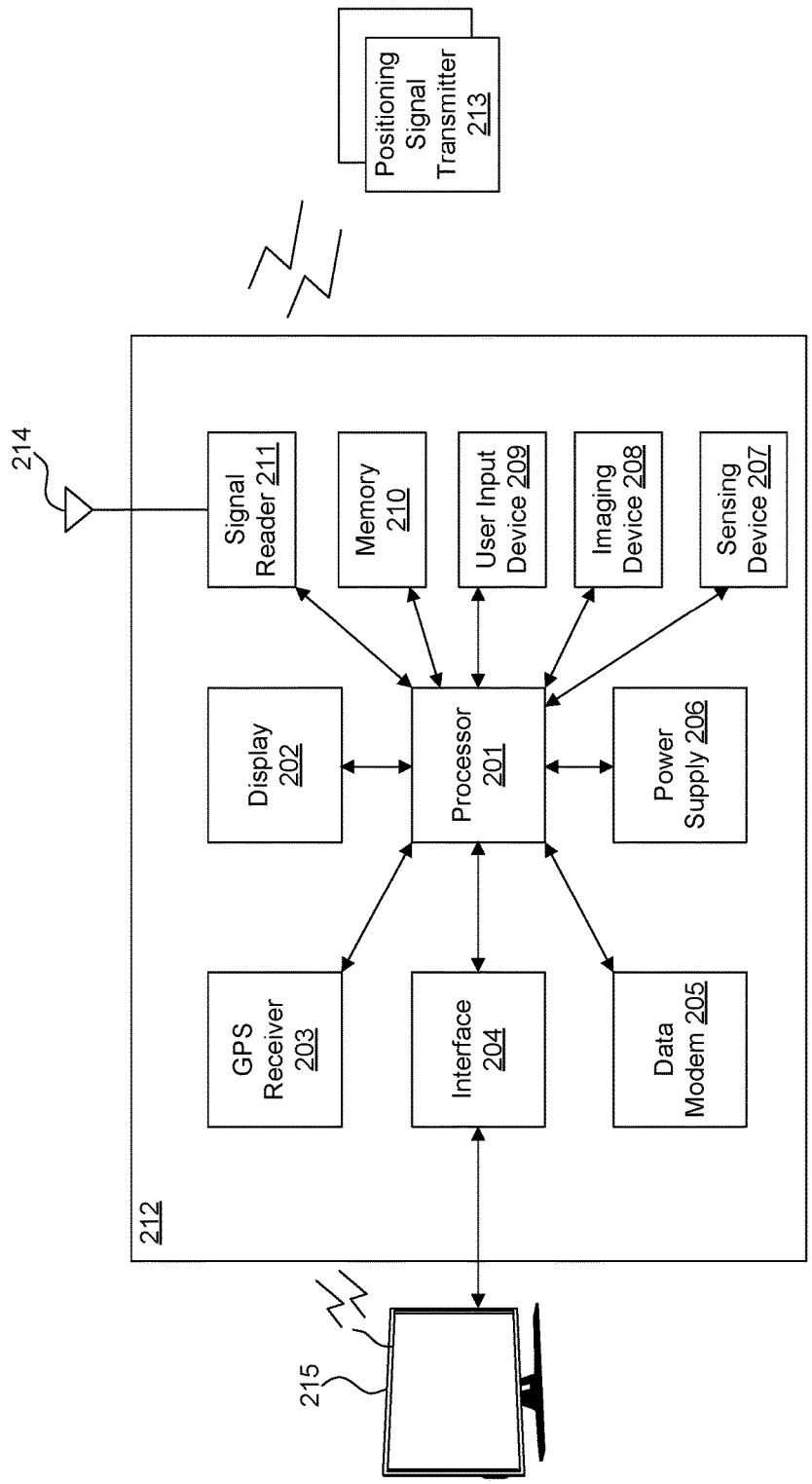
FIG. 2 illustrates a block diagram of a communication device for guards of a controlled environment, according to embodiments of the present disclosure.

FIG. 2 illustrates a block diagram of multi-functional platform 200, according to embodiments of the present disclosure. In an embodiment, multi-functional platform 200 includes a communication device 212 and a plurality of positioning signal transmitters 213. In an embodiment, communication device 212 communicates with one or more positioning signal transmitters 213 distributed in the controlled environment to provide positioning information to control center 102 (shown in FIG. 1) so that control center 102 receives real-time updates, e.g., path, moving speed, dwelling time, conversations, heart rate, and/or surroundings, of the monitored user carrying communication device 212. Communication device 212 can be any suitable portable device, e.g., a mobile phone, a tablet, and/or a laptop computer. Communication device 212 can be carried at a convenient portion of the monitored user's body for ease of use.

Communication device 212 includes a processor 201, a display 202, a GPS receiver 203, an interface 204, a data modem 205, a power supply 206, a sensing device 207, an imaging device 208, a user input device 209, a memory 210, a signal reader 211, and an antenna 214. Directions of arrows reflect the directions of data/signal flow. The connection between different parts of communication device 212 includes any suitable wired (e.g., Ethernet) connection or wireless connection. The wireless connection can be implemented as one or more of a wide-area network (WAN) connection, a local area network (LAN) connection, the Internet, a Bluetooth connection, and/or an infrared connection. Other types of implementations for a wired or wireless connection are possible without deviating from the scope of the present disclosure.

Processor 201 receives signals/data from different parts of communication device 212, processes these signals/data, and respond accordingly. Processor 201 is also programmed to control the operations of other parts of communication device 212. Memory 210 stores any necessary data for calculation of processor 201. In an embodiment, memory 210 stores at least a portion of the data stored in database 113. Data modem 205 includes any suitable data transmission devices for transmitting data to control center 102. Power supply 206 provides power to other parts of communication device 212. User input device 209 includes any suitable devices for receiving type-in messages, voice messages, scanned images, etc. Display 202 includes any suitable display devices such as light-emitting diode (LED) display and/or liquid-crystal display (LCD) devices for displaying any text, graphics, images, and/or videos determined by processor 201. Data modem 205 includes any suitable wireless transmission device for sending data/signals to control center 102 and receiving data/signals from control center 102. Interface 204 is configured to communicate with other systems/devices 215 outside of communication device 212.

GPS receiver 203 provides location information, e.g., coordinates, of the monitored user carrying communication device 212, when GPS signals are available. For example, when the monitored user is in an outside environment of the controlled environment, GPS receiver 203 sends current coordinates of the monitored user to processor 201. In an embodiment, processor 201 processes the data, extracts the map stored in memory 210, and simulates the current location in the map of the controlled environment. Processor 201 also encrypts the coordinates and sends the encrypted coordinates to control center 102 (shown in FIG. 1) through data modem 205. Meanwhile, processor 201 displays the map and the current location, path, moving speed, and/or dwelling times of the monitored user, along with the map in display 202. Processor 201 also responds accordingly based on the current status of the monitored user. For example, processor 201 determines whether abnormal activities have been detected and notifies the monitored user if abnormal activities have been detected. In an embodiment, processor 201 sends an alert to control center 102 when abnormal activities are detected.

Signal reader 211 includes one or more devices, integrated or separate, for detecting suitable wireless signals. In an embodiment, signal reader includes one or more antennas, represented by element 214 in FIG. 2. Signal reader 211 is configured to, in a detectable distance, detect any wireless positioning signals, any wireless identification signals, and/or any wireless communication signals. In an embodiment, wireless positioning signals include positioning signals used in various positioning systems such as RF signals, Bluetooth signals, WiFi signals, ultrasonic signals, etc. Wireless identification signals include signals emitted by ID tags or devices, such as RFID worn by inmates, and ID signals emitted by electronic devices. Wireless communication signals include any cellular or WiFi signals transmitted by electronic devices, such as cellular signals transmitted by a mobile device. Signal reader 211 is scans a wide range of frequencies and send detected signals to processor 201. In some embodiments, processor 201 has the option to encrypt detected wireless signals and send them to control center 102 for further analysis. In an embodiment, processor 201 also calculates/analyzes detected signals.

Processor 201 is recognizes the types of detected signals based on the frequencies. If the signals are wireless positioning signals, processor 201 calculates the location/position of the monitored user based on certain parameters, e.g., strengths of signals, and reference data, stored in memory 210. A signal reader 211 is detects positioning signals of one or more positioning methods, transmitted from different positioning signal transmitters 213 located at same or different nearby places. Processor 201 calculates the location under different positioning methods. Processor 201 has the option to select one location with the highest precision, or supplement different positioning methods using one another to obtain a corrected location. In an embodiment, processor 201 simulates the location of the monitored user and display 202 displays the real-time status, e.g., path, location, moving speed, and/or dwelling time in the map of the controlled environment. Processor 201 also responds accordingly based on the current status of the monitored user. For example, processor 201 determines whether abnormal activities have been detected and notifies the monitored user if abnormal activities have been detected. In an embodiment, processor 201 sends an alert to control center 102 when abnormal activities are detected.

If the detected signals contain wireless identification signals, processor 201 extracts identification information from the signals and determine the location or proximity of objects/subjects transmitting the identification signals based on current location and information contained in the identification signals. In an embodiment, processor 201 simulates the locations/proximities of the objects/subjects and display 202 displays the real-time status, e.g., locations/proximities and moving speed in the map of the controlled environment. Processor 201 also responds accordingly based on the current status of the detected objects/subjects. For example, processor 201 determines sending an alert to control center 102 when abnormal activities, e.g., objects/subjects being at forbidden locations/proximities, are detected.

If the detected signals contain wireless communication signals, processor 201 filters unknown or forbidden communication signals from the detected signals. Based on the location and proximity information determined, processor 201 also determines the location/proximity of a contraband wireless communication signal and display the contraband wireless communication signal at the location/proximity it's detected, in the map. In an embodiment, processor 201 notifies monitored user the detection of any contraband wireless communications and sends the detection result to control center 102.

Sensing device 207 includes one or more suitable sensors, integrated or separate, for detecting biometric features, heart rate, body motion, etc. For example, sensing device 207 includes a camera, a fingerprint scanner, a retina scanner, a heart rate sensor, and/or a body motion sensor. Sensed signals are sent to processor 201 to be processed. Processor 201 analyzes the sensed data and determines whether any abnormal activities occur. For example, processor 201 detects whether data reflecting a sudden change in heart rate and/or body motion is contained in the sensed data. In an example, biometric sensors are used for authenticating the identity of the monitored user and/or identify inmates/other personnel. For example, an inmate's biometric samples can be recorded and sent to control center 102 for analysis and/or recording purposes.

Imaging device 208 includes any suitable devices for recording and streaming images and videos, e.g., camera and/or infrared camera. The monitored user and control center 102 have the ability to control the functioning of imaging device 208. The monitored user and control center 102 turn on imaging device 208 at a desired time. In some embodiments, when an abnormal activity is detected, control center 102 and/or communication device 212 automatically turn on imaging device 208 to start recording or streaming.

Positioning signal transmitters 213 include any suitable passive and active signal transmitters for transmitting wireless signals that can be used for calculating the location/position of the monitored user. Positioning signal transmitters 213 include transmitters of one or more types of positioning methods. In an example, positioning signal transmitters 213 include one or more of RF tags, Bluetooth beacons, WiFi access points, ultrasonic transmitters, etc. Positioning signal transmitters 213 are distributed in desired locations to convenient transmit positioning signals to communication device 212. Antenna 214 represents any suitable number of signal receivers necessary to detect the positioning signals.

In various embodiments, communication device 212 automatically switches from "indoor mode" to "outdoor mode" when GPS signals are sufficiently strong and positioning signals are weak, and vice versa. Control center 102 also has the authority to select one or more positioning methods on the communication device 212. In some embodiments, control center 102 selects GPS positioning to be supplemented with other positioning methods to provide positioning information of desirable precision.

In various embodiments, communication device 212 periodically sends detected/sensed signals/data to control center 102 for analysis and updates. Accordingly, control center 102 determines the response to any inquiry from communication device 212. In some embodiments, communication device 212 analyzes and responds to certain signals/data without inquiring control center 102. In an example, communication device 212 stores the map of the controlled environment and simulates the current path, location, and/or moving speed of the monitored user in the map based on positioning data. When an abnormal activity is detected, an alert is sent to the authorized user and/or control center 102. Meanwhile, communication device 212 sends positioning data to control center 102 so that control center 102 updates and monitored current status of the monitored user.

Figure 3:
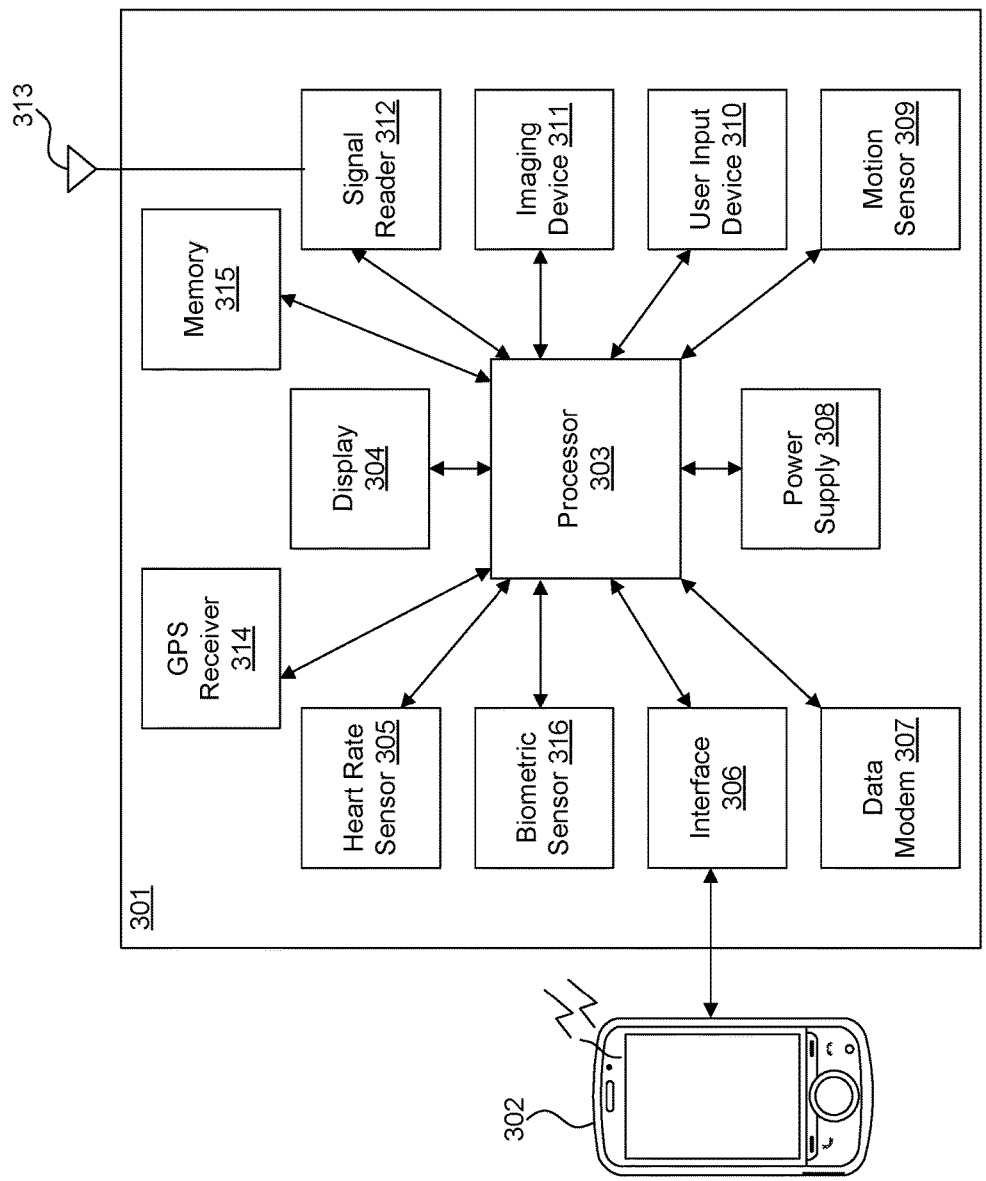
FIG. 3 illustrates a block diagram of a wearable device for guards of a controlled environment, according to embodiments of the present disclosure.

FIG. 3 illustrates a block diagram 300 of a wearable device containing certain functions to supplement certain functions of communication device 212. In an embodiment, wearable device 301 includes any suitable wearable devices being fixed onto the monitored user, such as a watch, a strap, and/or a band. Wearable device 213 is fixed at a portion of the monitored user's body to more conveniently detect certain signals/data. For example, wearable device 301 is in the form of a watch or band, fixed on the monitored user's arm.

Similar to communication device 212, wearable device 301 includes a processor 303, a display 304, an interface 306, a data modem 307, a power supply 308, a user input device 310, an imaging device 311, a signal reader 312, an antenna 313, a GPS receiver 314, a memory 315, and a biometric sensor 316. Device 302 represents any device, e.g., communication device 212 or a device outside of communication system 100, in communication with wearable device 301 through interface 306. The functions of these parts are similar or same as the corresponding parts in communication device 212 and are not repeated herein. In one embodiment, processor 303 sends received signals/data to corresponding communication device 212 or control center 102 for processing and analysis. Accordingly, processor 303 receives commands/inquiries from communication device 212 and/or control center 102 to execute functions.

Specifically, wearable device 301 includes a heart rate sensor 305 and a motion sensor 309. In an embodiment, wearable device 301 more accurately detects the heart rate change and body motion change of the monitored user. Detected heart rate and body motion are sent to communication device 212 and/or control center 102 to be processed and analyzed.

In another example, monitored user has the option to use wearable device 301 to record images and videos, or stream videos. Compared to communication device 212, wearable device 301 is smaller, easier to carry and wear, and provides more convenience and shorter response time for certain actions. In various embodiments, monitored user has the option to use one or more of the communication device 212 and wearable device 301.

Figure 4:
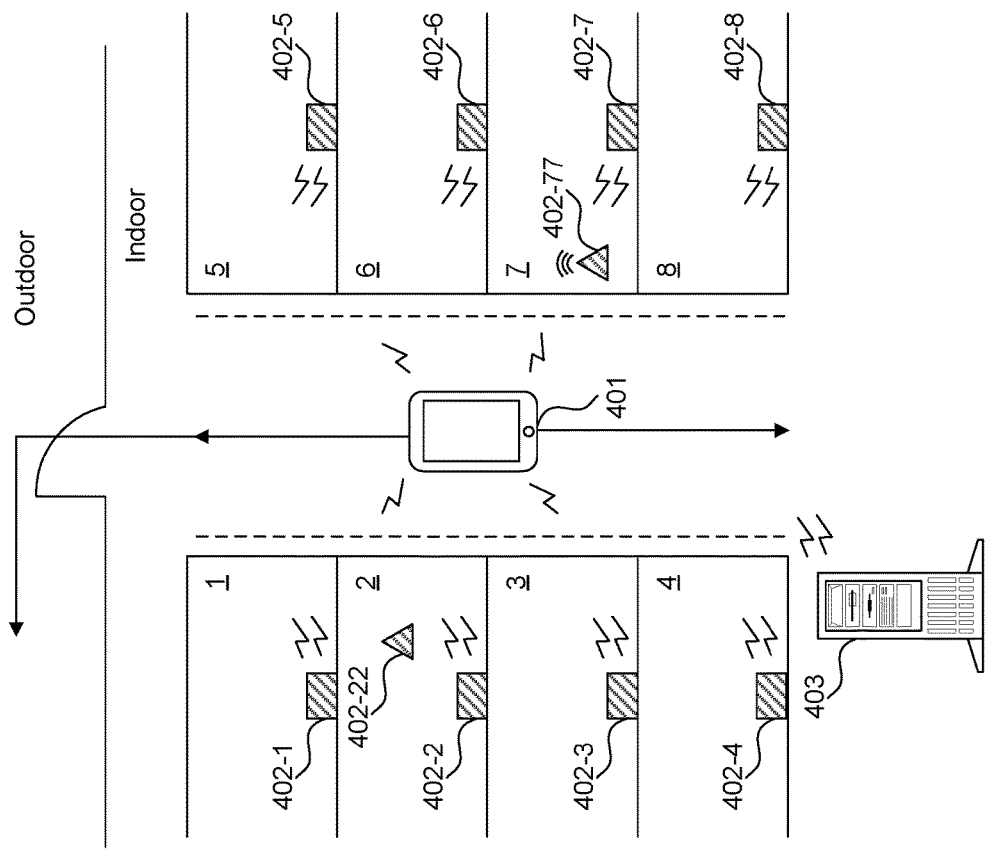
FIG. 4 illustrates a block diagram of an indoor map of a controlled environment, according to embodiments of the present disclosure.
Figure 5:
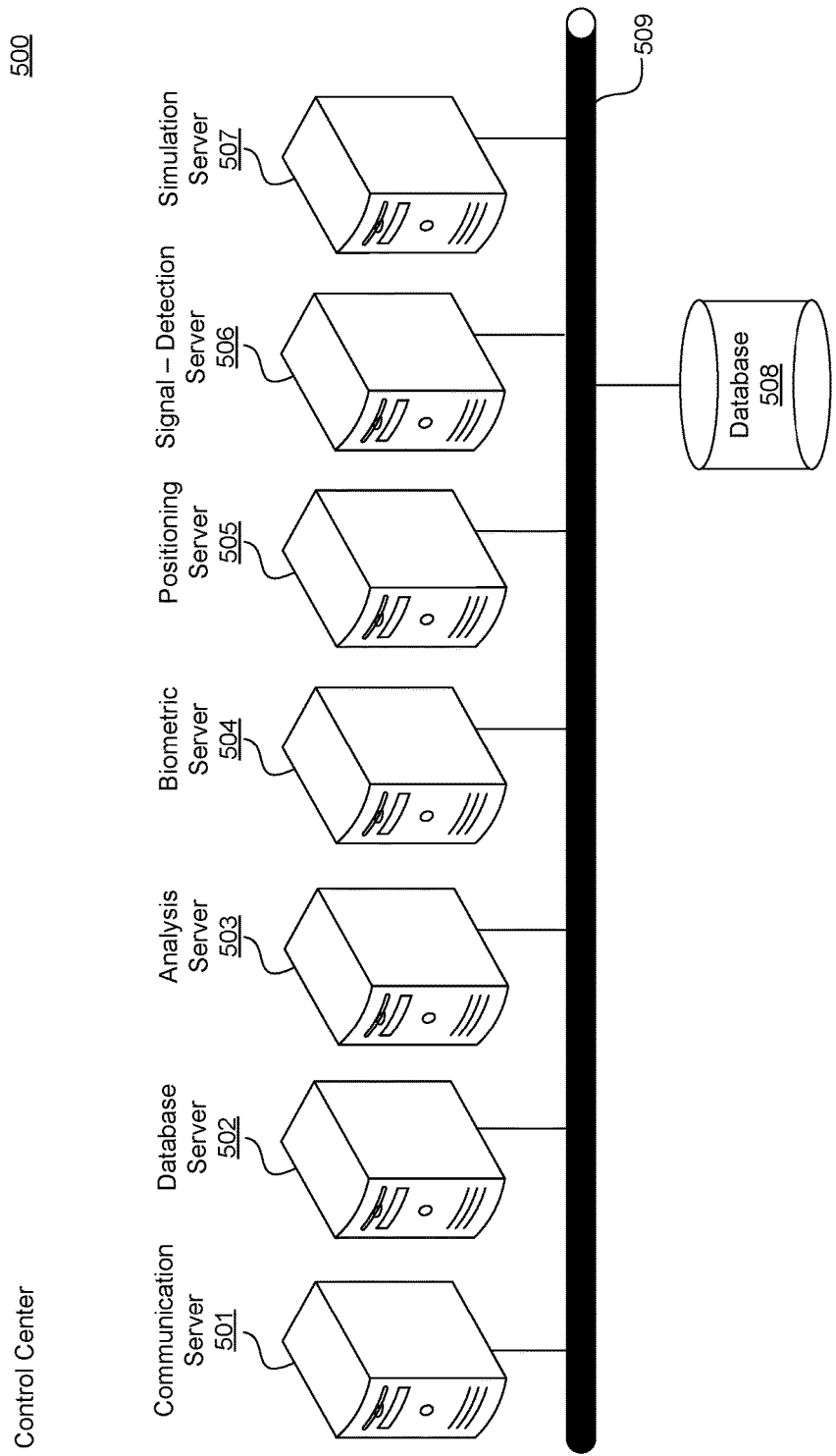
FIG. 5 illustrates a block diagram of a control center of a controlled environment, according to embodiments of the present disclosure.

FIG. 4 illustrates a portion of a simulated map 400 reflecting certain status of subjects/objects in the area corresponding to the portion of map 400. Map 400 is simulated based on the signals/data provided by communication device 401 and stored map data. Activities reflected by map 400 indicate real-time status of each subject/object detected by communication device 401. Communication device 401 is similar to or same as communication device 212 described previously. In an example, the guard is represented by communication device 212. Map 400 is displayed at control center 102. In various embodiments, map 400 is also displayed on communication device 401 carried by the monitored guard.

As shown in FIG. 4, the map shows the controlled environment includes an indoor environment and an outdoor environment. The indoor environment contains rooms or cells 1-8, each being installed a positioning signal transmitter 402-$n$ ($n$=1, 2, . . . , 8) in the room. A positioning signal transmitter 402-$n$ represents one or more transmitters of same or different types of positioning methods, e.g., Bluetooth, WiFi, RF, ultrasound, where they can be installed in same or different positions in a room. The positions of the transmitters allow signals transmitted by the transmitters to be sufficiently strong in a detectable distance range of a detecting devices, e.g., communication device 401. As shown in map 400, one inmate is positioned in room 2, wearing an ID tag 402-22, and another inmate is positioned in room 7, wearing an ID tag 402-77. Inmate in room 7 possesses a contraband wireless device. The guard is walking along the aisle for, e.g., a walk and observe assignment. In an embodiment, map 400 shows a designed path, the double-headed arrow, for the guard to follow. The area between the dashed lines is a permitted area to the guard, e.g., guard is free to move in the area but is not expected to go beyond the dashed lines. Element 403 represents any electronic device for communicating with communication device 401.

In an embodiment, a guard carries communication device 401 in an assignment. When guard is in the indoor environment, communication device 401 automatically switches to "indoor mode," and transmits detected signals/data to control center 102 (not shown in FIG. 4) in real-time. Positioning signal transmitters 402-$n$ ($n$=1-8) includes WiFi access points transmitting known WiFi signals and other related parameters, e.g., MAC addresses, of the access points. Inmates in room 2 and 7 each wears an RFID, containing identification information of the inmates. Communication device 401 receives the WiFi signals and other parameters transmitted by nearby access points, transmits received WiFi signals and parameters to control center 102, and calculates the real-time location of communication device 401 based on the received WiFi signals and parameters, and pre-stored reference signal strength data of the WiFi signals. As the guard is moving, communication device 401 continuously and periodically sends received WiFi signals and parameters to control center 102 and calculates the real-time location of communication device 401. Communication device 401 further calculates moving speed, path, and/or dwelling times based on the positioning data. Results of the calculation are displayed on communication device 401. Meanwhile, control center 102 similarly calculates the location, moving speed, path, and/or dwelling times based on received data. If an abnormal status is detected, e.g., guard moves beyond the permitted area, e.g., deviates from the designed path, both communication device 401 and control center 102 generate an alert, prompting the guard to respond within a certain period of time, e.g., one minute. If guard fails to respond within this period of time, communication device 401 starts streaming video to control center 102. In another example, if communication device 401 is detected to be staying at one location or certain locations for an unexpected long period of time, both communication device 401 and control center 102 generate an alert, prompting the guard to respond within a certain period of time. In an embodiment, when guard is detected to have deviated from the designed path, communication device 401 automatically starts recording video and streaming the recorded video to control center 102. In another embodiment, control center 102 controls communication device 401 and wearable device 301 to both start recording and streaming videos when guard is detected to have deviated from the designed path.

In another embodiment, communication device 401 detects and counts the presence of inmates in the detectable distance range. Communication device 401 reads out identification information transmitted by the ID tags, e.g., RFID tags 402-22 and 402-77, carried by the inmates, and sends the identification information to control center 102. Control center 102 compares the identification and location information with pre-stored inmate data and determines whether the presence information matches pre-stored inmate data. If a mismatch is found, e.g., inmate absent or inmate in the wrong cell, control center 102 send an alert to communication device 401, prompting guard to check and confirm. If guard fails to respond within a certain period of time or confirms absence, control center 102 sends an alert to other guards carrying communication devices 401 and/or other personnel. In an embodiment, ID tags 402-22 and 402-77 also contain Bluetooth beacons. Communication device 401 detects the location and moving of inmates carrying the ID tags based on received Bluetooth signals. In an example, when communication device 401 detects an inmate is moving towards guard at an unusually high speed, communication device 401 alerts the guard. Guard has the option to respond to such situation by notifying control center 102 and/or other personnel. In various embodiments, positioning information of inmates are also sent to control center 102 through communication device for further processing and calculation.

In an embodiment, ID tags, e.g., 402-22 and 402-77, contain the criminal and/or violation history of corresponding inmates, which are also stored in control center 102. When an inmate having a history of aggression or malice behavior, e.g., malice towards personnel in the controlled environment, is detected to be in the proximity of guard, communication device 401 or control center 102 sends an alert to guard, notifying him/her the presence of such inmate.

In an embodiment, communication device 401 detects an unknown wireless signal within the detectable distance range, e.g., transmitted from cell 7. The unknown signal, corresponding location, and/or corresponding inmate information are thus detected by communication device 401 and control center 102. Control center 102 further starts investigation of the contraband wireless device.

In an embodiment, when guard undergoes a sudden body motion or sudden heart rate increase/decrease, communication device 401 sends an alert to control center 102 and starts streaming video. In various embodiments, guard has the option to initiate communication, e.g., texting, video chatting, sending images and voice messages, and/or record images and videos during an assignment. Guard also has the option to start streaming videos at a desired time.

In an embodiment, communication device 401 includes voice control functions. A voice sample of guard is stored and registered in communication system 100 for authenticate guard's identity. Guard has the option to activate certain functions of communication device 401 using his/her voice and/or certain phrases. In some embodiments, a communication device 401 can only be voice controlled by the guard assigned to communication device 401.

In an embodiment, wireless device 403 communicates with communication device 401 by sending related information, e.g., type, manufacturer, usage, operation status, etc. In some embodiments, wireless device 403 is controlled by control center 102 and/or communication device 401. Guard and/or control center 102 have the option to remotely control certain functions of wireless device 403, e.g., recording of videos, sending location of wireless device 403 to communication device 401/control center 102, and so on. The availability of functions are dependent on the type of wireless device 403 and should not be limited by the embodiments of the present disclosure.

In an embodiment, when guard enters the outdoor environment, communication device 401 directly switches to the "outdoor mode," and starts sending GPS coordinates to control center 102 in real-time. Meanwhile, communication device 401 calculates positioning information using GPS coordinates and updates the positioning information on the map.

In various embodiments, guard also wears a wearable device 301 as shown in FIG. 3. The operation of the wearable device 301 is similar to communication device 401. In some embodiments, communication device 401 receives heart rate data and body motion data of the guard from wearable device 301 and sends the data to control center 102. For example, when guard undergoes a sudden acceleration of movement, e.g., falling on the floor, wearable device 301 and/or communication device 401 detect such abnormal activity and send an alert to control center 102. In some embodiments, the recording/streaming functions of communication device 401 and wearable device 301 can be used separately. That is, the guard has the option to use communication device 401 and wearable device 301 at same time for recording/streaming different scenes, or use communication device 401 and wearable device 301 at different times. Control center 102 has the authority to control the operation of communication device 401 and wearable device 301.

In some embodiments, wearable device 301 includes only certain functions of communication device 401 to supplement communication device 401. Accordingly, wearable device 301 can have reduced volume and size, and is easier to wear. For example, wearable device 301 may only have the heart rate and body motion monitoring function and data transmission function. Detected heart rate and body motion data is sent to communication device 401 or control center 102 for processing and analysis. In some embodiments, communication device 401 and wearable device 301 have complementary functions.

Depending on different applications and design preferences, communication system 100, including control center 102, communication device 401, and wearable device 301 are configured to respond to different situations differently. In various embodiments, communication system 100 is configured to track and monitor the activities and behavior of guard, and respond accordingly when any abnormal status is detected. For example, communication system 100 has the authority to track the path, moving speed, dwelling time, conversation, heart rate changes, body movement changes, surroundings, and/or violations of codes. In various embodiments, communication device 401 records a history of activities occurred during a certain period of time, e.g., a day or an assignment. In response to a detection of an abnormal situation of any of the mentioned activities, communication system 100 is configured to perform one or more of, e.g., sending an alert to guard and control center 102, starting recording images, videos, and/or sounds, sending relevant information to control center 102 and other personnel, etc. The combination of situations and responses should be subjected to designs and preferences of different applications and should not be limited by the embodiments of the present disclosure.

Control Center

Control center 500 is configured to receive data, process data, and/or make decisions based on the processing results. Control center 500 is similar to or same as control center 102 in previous description of the present disclosure. In an embodiment, control center 500 includes communication server 501, database server 502, analysis server 503, biometric server 504, positioning server 505, simulation server 507, and database 508, all of which are connected to one another via a network bus 509. In some embodiments, the functions of communication server 501, database server 502, analysis server 503, biometric server 504, positioning server 505, signal-detection server 506, simulation server 507, and database 508 are implemented within a single device. Each of servers 501-507 can be constructed as individual physical hardware devices, or as virtual servers. The number of physical hardware machines can be scaled to match the number of simultaneous user connections desired to be supported by communication system 100. For control center 500 includes any suitable database for storing data received from the servers and other parties. Additional database can also be included in database 508 to facilitate proper functions of control center 500.

In an embodiment, communication server 501 consists of one or more servers, and is configured to receive and transmit information to/from one or more authorized facilities such as control center 500 and multi-functional platform 101. Communication server 501 receives input from multi-functional platform 101 and other parties and send the processed input to analysis server 503. That is, communication server 501 forwards inquiries to respective analysis server 503 through network bus 509 for analysis of and generation of a response to the inquiry. Communication server 501 further receives the response from analysis server 503 and forwards the response to the appropriate party.

In an embodiment, communication server 501 is further configured to perform authentication of inquiries to determine whether the submitting facility or party is authorized to access the information located in database 508. If the facility or party is authenticated, communication server 501 continues with the inquiry process by, for example, forwarding the inquiry to analysis server 503. Moreover, communication server 501 is further configured to encrypt and decrypt all communications transmitted and received by communication system 100 for security purposes. In an embodiment, a facility/party is authorized only to write data into database 508, only to read data from database 508, or authorized to both read data from and write data into database 508. In another embodiment, communication server 501 is configured to provide different levels of access to database 508 based on the type of facility and the type of party. Moreover, access to data within database 508 may vary based on the type of data to which access is sought. For example, one facility can be authorized only to access certain types of data into database 508, such as the data that the facility has uploaded. Another facility can be authorized to access its data as well as data provide by other facilities. The access by facilities can be limited to read only, write only, or read/write based on the type of facility, the type of data, or any other parameters related to the unified database system.

In an embodiment, database server 502 consists of one or more servers, and is configured to store and organize data in database 508. Database server 502 can be configured to run a database management system, such as MYSQL™. Database server 502 interfaces with database 508 to store information provided to communication system 100 multi-functional platform 101 and other parties. Database server 502 can further be configured to provide information from database 508 to connected facilities who submit inquiries. Moreover, database server 502 is configured to encrypt the information prior to storage to ensure security of the information.

In an embodiment, analysis server 503 consists of one or more servers, and functions as the primary logic processing center in control center 500. Analysis server 503 processes information input from other servers, multi-functional platforms 101 of different monitored users, and information input from monitoring users at control center 500. Analysis server 503 makes decisions based on the information input, and responds correspondingly. As part of its functionality to conduct analysis of inquiries based on data in database 508, analysis server 503 can further be configured to manage and facilitate communication between communication server 501, database server 502, biometric server 404, positioning sever 505, simulation server 507, and database 508.

In various embodiments, analysis servers 503 also generates logs and reports reflecting activities of monitored users. The logs and reports may include analytical reports and visual representations of a monitored user's activities in a certain period of time. In various embodiments, because analysis server 503 is connected to database 508 and other servers, analysis server 503 analyzes patterns based on data received from other servers and retrieved from database 508 to determine whether a detected activity or status is abnormal and responds accordingly.

In an embodiment, biometric server 504 consists of one or more servers, and is configured to process and/or store biometric data of inmates and other personnel in the controlled environment. Biometric data can include any information regarding an inmate's or personnel's appearance, physical characteristics, or other identifying traits that may be unique to the person such as voice data, facial recognition data (2D or 3D), handwriting samples, and/or fingerprint data. Biometric server 504 is configured to assist in analyzing biometric input sent from multi-functional platform 101. For example, biometric server 504 can compare received biometric input against stored biometric data.

In an embodiment, positioning server 505 consists of one or more servers, and is configured to determine the location of a monitored user based on received data/signals from multi-functional platform 101 and data stored in database 508. Received data/signals include signals transmitted by positioning signal transmitters and GPS coordinates. Positioning server 505 includes algorithm(s) an models for calculating the indoor location and outdoor location of a monitored user, based on received data/signals and reference data stored in database 508. Positioning server 505 also includes algorithm(s) for calculating the surroundings, e.g., presence of inmates and certain electronic devices, of a monitored user based on received data/signals and reference data stored in database 508. Results of calculation are further sent to analysis server 502 for further processing or decision making, or sent to simulation server 507 to be visualized.

In an embodiment, signal-detection server 506 consists of one or more servers, and is configured to detect wireless signals within a scanned wavelength range. Signal-detection server 506 is configured to scan one or more wavelength ranges to capture wireless signals, e.g., WiFi signals, RF signals, Bluetooth signals, and/or ultrasound signals. Information of detected signals is transmitted to analysis server 503 to separate the unknown or suspicious wireless signals from the known and allowed wireless signals. Known or allowed wireless signals are further analyzed to determine their usage, e.g., for positioning or identification, etc. Unknown wireless signals are further analyzed to determine the properties and possible sources.

In an embodiment, simulation server 507 consists of one or more servers, and is configured to simulate real-time activities of a monitored user based on data stored in database 113 and signals/data sent from other servers. Simulation server 507 is extracts coordinates information from database 113 to generate a map of controlled environment, and simulates/updates the path, moving speed, and dwelling times of the monitored user in the map so that the map reflects the real-time status of the monitored user. Simulation server 507 also simulates other detectable objects/subjects in real-time in the map based on data/signals received from other servers. For example, simulation server 507 also simulates the presence and status of inmates wearing/carrying certain signal-transmitting tags, e.g., radio frequency (RF) ID tags, and any devices transmitting a suitable detectable signal. The detectable objects/subjects are also displayed in the map.

In an embodiment, database 508 provides access to all communication system 100 used for various calculations. In general, database 508 stores any data stored by communication server 501, database server 502, analysis server 503, biometric server 504, positioning server 505, and simulation server 507. Because the data stored on database 508 may consume a significant amounts of storage space, database 406 may include a Network Attached Storage (NAS) device, which is configured as a mass storage device, or configured as a storage area network (SAN) comprising multiple storage devices. In order to reduce the required size, database 508 preferably includes a backup routine to transfer data to permanent storage devices, such as archival permanent storage or optical disks, after a predetermined time has elapsed since the initial recording of that data. Database 508 is connected to communication server 501, database server 502, analysis server 503, biometric server 504, positioning server 505, and simulation server 507 by way of the network bus 509.

System Operations

Operations of monitoring activities of a monitored author using communication system 100 will be described with respect to FIGS. 6, 7, and 8. Although the physical devices and components that form the system have largely already been described, additional details regarding their operations will be described below with respect to FIGS. 1-5. While FIGS. 6, 7 and 8 contain methods of operation of communication system for guards of a controlled environment 100, the operations are not limited to the order described below, and various operations can be performed in a different order. Further, two or more operations of each method can be performed simultaneously with each other.

Figure 6:
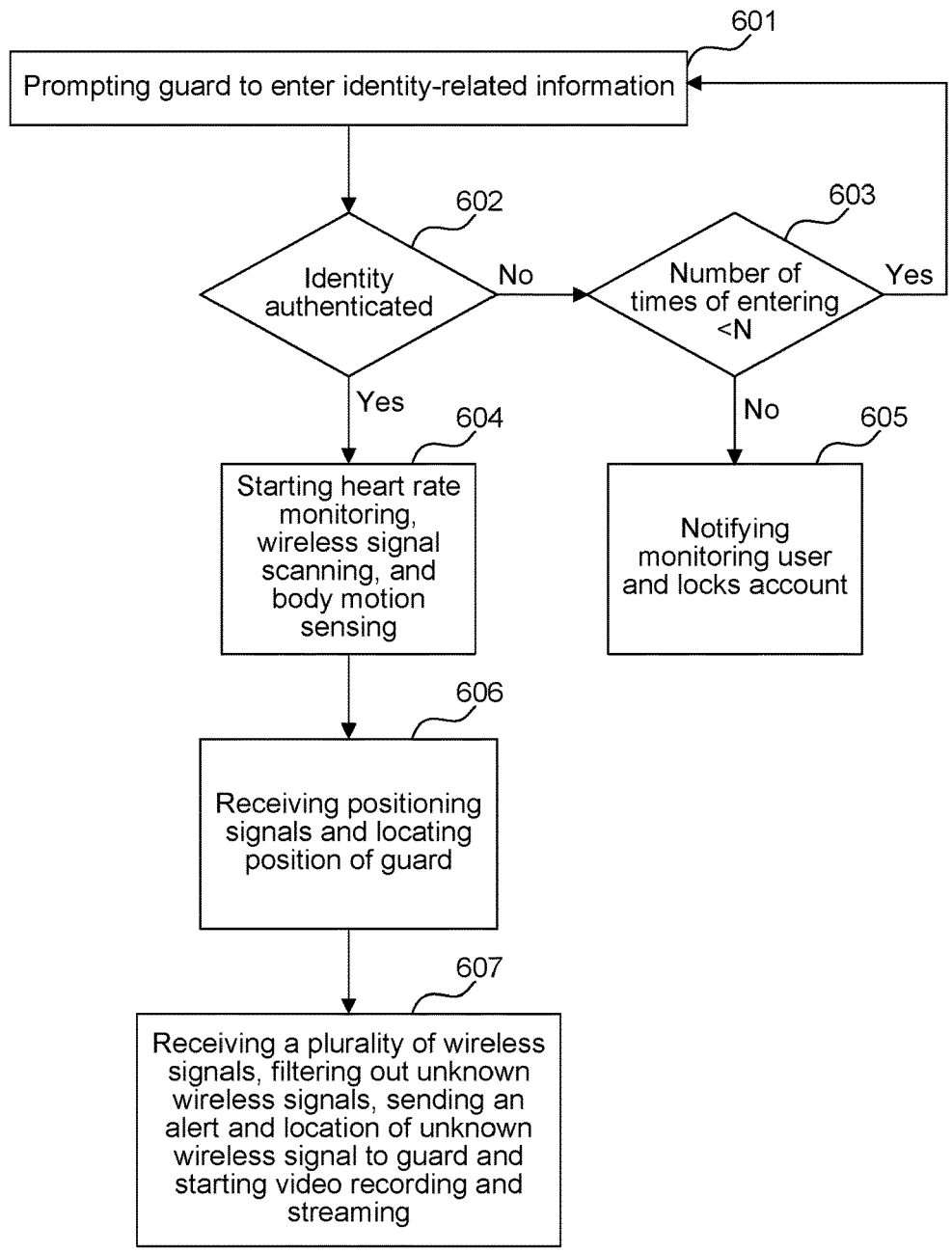
FIG. 6 illustrates a flowchart diagrams of methods of tracking of guard and detecting a suspicious wireless signal, according to embodiments of the present disclosure.

FIG. 6 illustrates a flowchart diagram of a method 600 of tracking of guard and detecting an unknown suspicious wireless signal, according to embodiments of the present disclosure. In step 601, control center prompts guard, carrying the multi-functional platform, to enter identity-related information into the multi-functional platform. In step 602, control center determines whether the identity of guard is authenticated. If the identity of guard fails to be authenticated, process proceeds to step 603; if the identity of guard is authenticated, process proceeds to step 604. In step 603, control center determines whether the number of times of entering the identity-related information is less than N, N being a positive integer, process returns step 601. If the number of times of entering the identity-related information exceeds N, process proceeds to step 605. In step 605, control center notifies monitoring user about failed attempts of identity authentication and locks the user's account. In step 604, control center starts heart rate monitoring, wireless signal scanning, and body motion sensing from the beginning of an assignment. In step 606, control center receives positioning signals and locates the position of guard. In step 607, control center receives a plurality of wireless signals, filters out unknown wireless signals, sends an alert and locations of unknown wireless signals to guard, and starts video recording and streaming videos from multi-functional platform.

Figure 7:
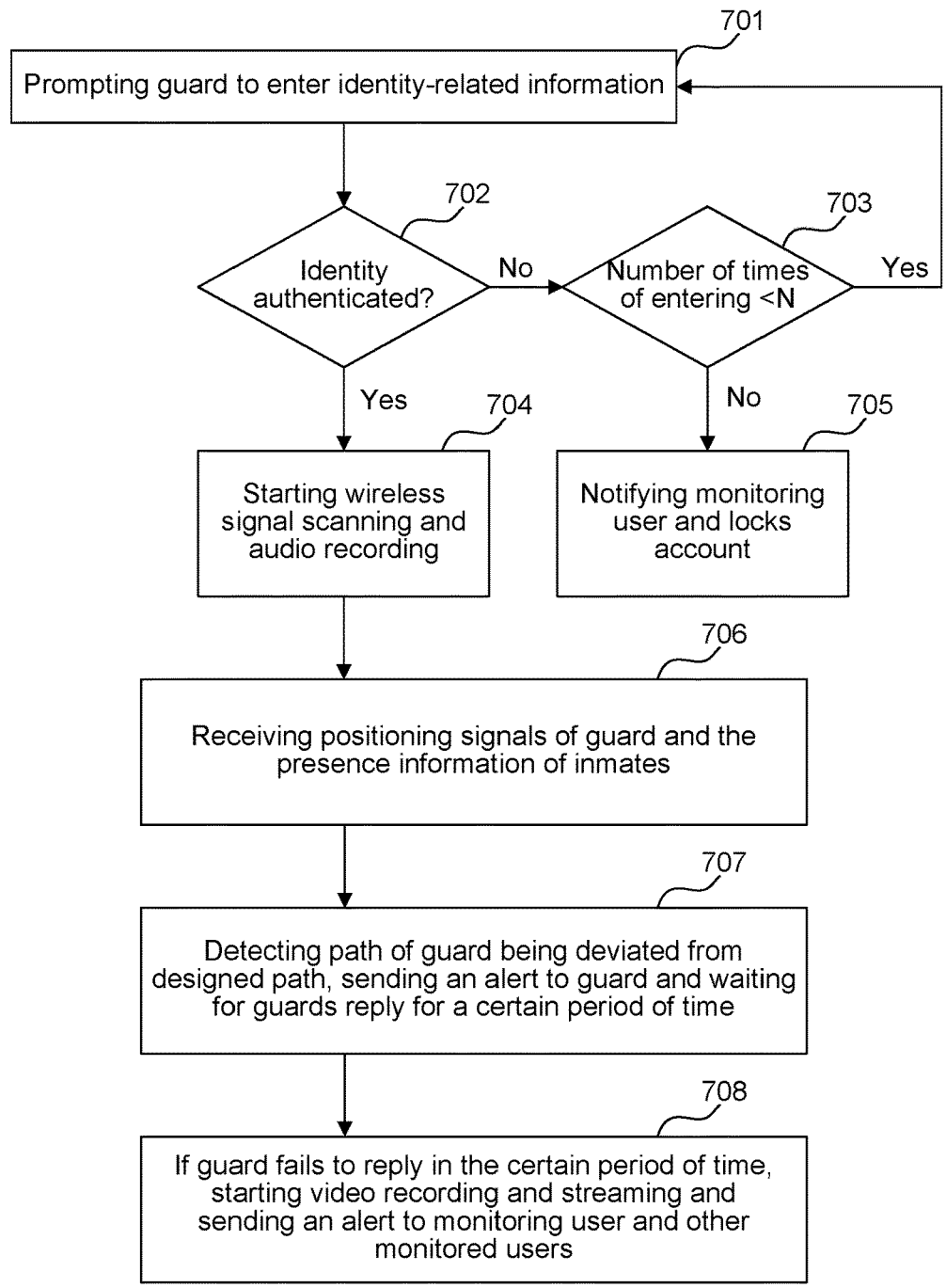
FIG. 7 illustrates a method of tracking of guard and detecting a deviation from path of guard, according to embodiments of the present disclosure.

FIG. 7 illustrates a flowchart diagram of a method of tracking of guard and detecting a deviation of path of guard, according to embodiments of the present disclosure. Steps 701-703 and 705 are similar to or same as steps 601-603 and 605, respectively. In step 704, control center starts wireless signal scanning and audio recording from the beginning of an assignment. In step 706, control center receives positioning signals of guards and presence information of inmates from the detected wireless signals. In step 707, control center detects path of guard being deviated from designed path, sends an alert to guard, and wait for guard's reply for a certain period of time. In step 708, if guard fails to reply in the certain period of time, control center starts video recording and streaming from multi-functional platform, and sends an alert to monitoring user and other monitored users.

Figure 8:
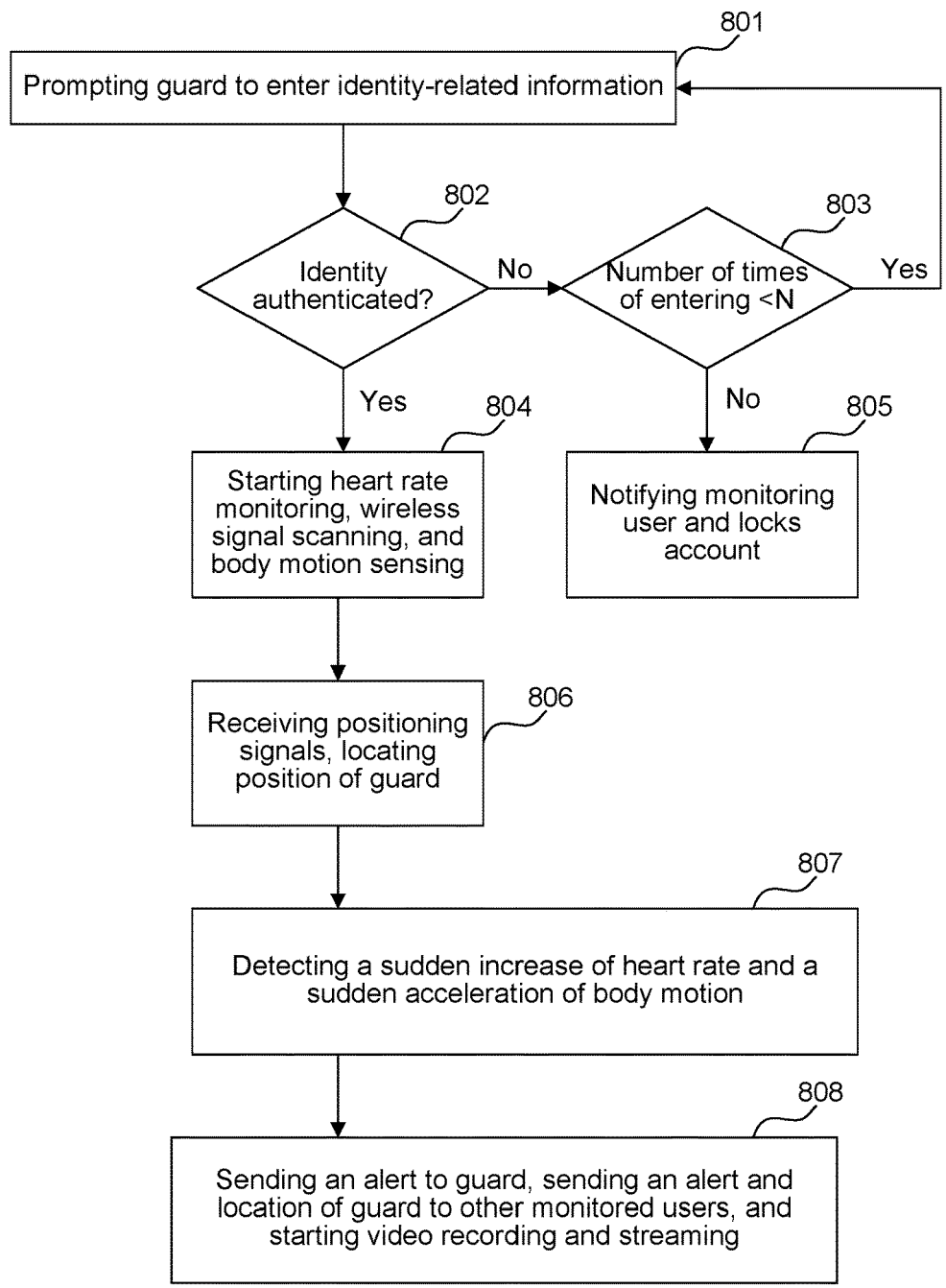
FIG. 8 illustrates a method of tracking of guard and detecting sudden changes in heart rate and body motion, according to embodiments of the present disclosure.

FIG. 8 illustrates a flowchart diagram of a method of tracking of guard and detecting sudden changes in heart rate and body motion, according to embodiments of the present disclosure. Steps 801-803 and 805 are similar to or same as steps 601-603 and 605, respectively. In step 804, control center starts heart rate monitoring, body motion sensing, and wireless signal scanning. In step 806, control center receives positioning signals and locates position of guard. In step 807, control center detects a sudden increase of heart rate and a sudden acceleration of body motion. In step 808, control center sends an alert to guard, sends an alert and location of guard to other monitored users, and starts video recording and streaming from the multi-functional platform.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 9:
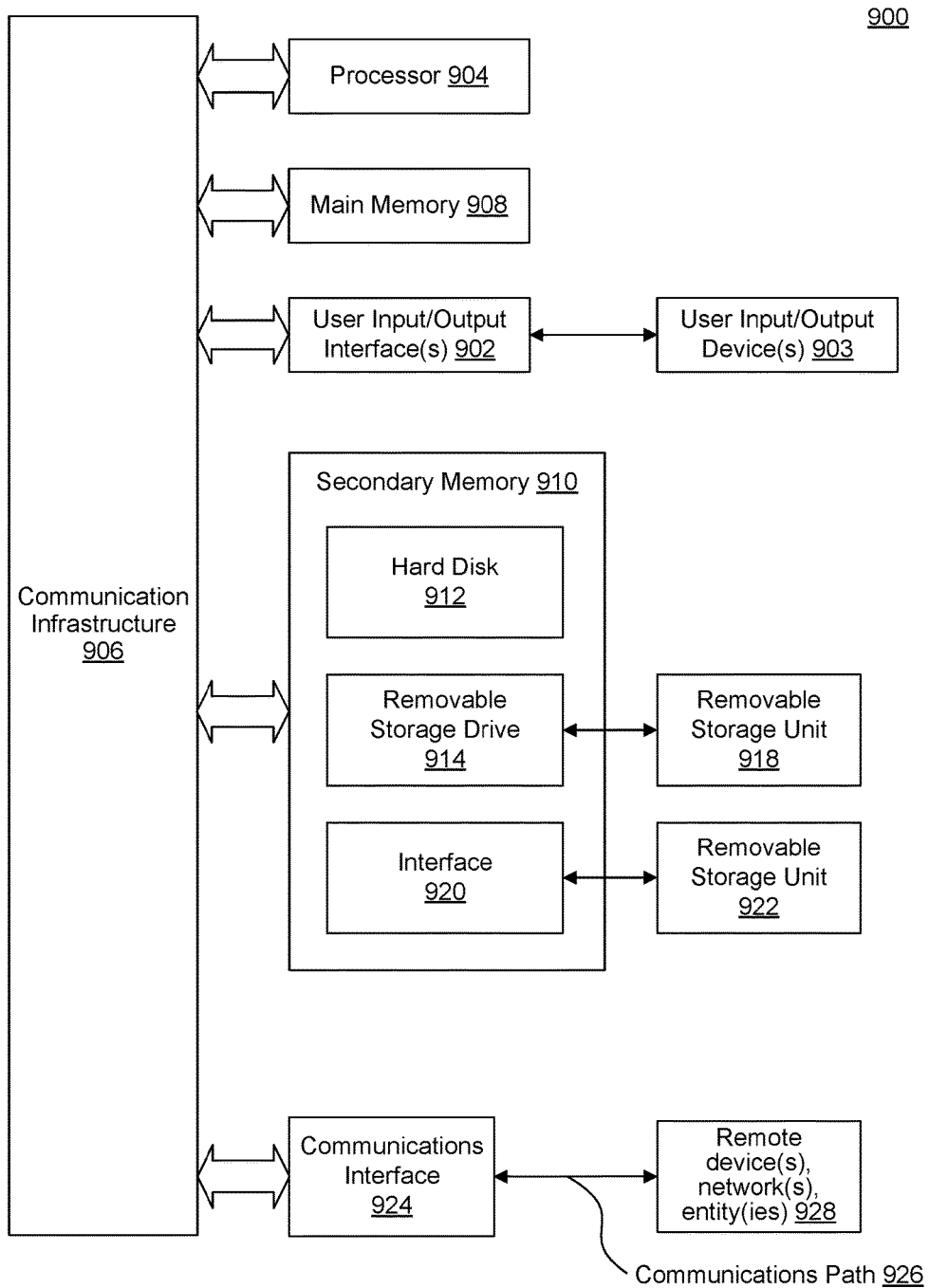
FIG. 9 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the control center of FIG. 1 and the methods of FIGS. 6-8 can be implemented in the environment of one or more computer systems or other processing systems. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 906 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 908, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, or the like. Removable storage drive 914 reads from and/or writes to a removable storage unit 918 in a well-known manner. Removable storage unit 918 represents a floppy disk, magnetic tape, optical disk, or the like, which is read by and written to by removable storage drive 914. As will be appreciated by persons skilled in the relevant art(s), removable storage unit 922 includes a computer usable storage medium having stored therein computer software and/or data.

In alternative implementations, secondary memory 910 can include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, a thumb drive and USB port, and other removable storage units 922 and interfaces 920 which allow software and data to be transferred from removable storage unit 922 to computer system 900.

Computer system 900 also includes user input/out interface(s) 902 which provide an interface to user input/output device(s) 903. Such user input/output device(s) 903 may be any device that provides a user access to input and output of computer system 900. Examples of user input/output device(s) 903 may include a keyboard, a computer monitor, a mouse, a camera, and a microphone.

Computer system 900 also includes a communications interface 924. Communications interface 924 allows software and data to be transferred between computer system 900 and external devices 928 which can include remote device(s), other network(s), and other entities. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 918 and 922 or a hard disk installed in hard disk drive 912.

These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 914, interface 920, or communications interface 924.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A multi-functional device for positioning and monitoring a user, the multi-functional device comprising:
   a transceiver configured to communicate with a communication network;
   a communication interface connected with a database configured to store positioning data configured for determining a location of the user and monitoring data configured for determining a real-time status associated with the user, and
   a processor configured to:
      receive at least one positioning signal from the communication network;
      receive at least one piece of status data;
      determine the location of the user based on the at least one positioning signal and the positioning data;
      determine whether the real-time status of the user is an abnormal status based on at least one of the positioning data, the positioning signal, the at least one piece of status data, and the monitoring data; and
      in response to the real-time status being an abnormal status, automatically perform a real-time monitoring process based on the location of the user,
   wherein the abnormal status comprises a contraband wireless signal in a detectable frequency range.

2. The multi-functional device according to claim 1, wherein the real-time status comprises at least one of a path of the user, a location of the user, a moving speed of the user, a dwelling time of the user, a heart rate of the user, a body motion of the user, a video recording of the user, an audio recording of the user, a message by the user, a response time of the user, a presence of an inmate, an identity of the inmate, a location of the inmate, and a moving speed of the inmate.

3. The multi-functional device according to claim 2, wherein the real-time status comprises at least a frequency of a wireless communication signal and a location of the wireless signal.

4. The multi-functional device according to claim 3, wherein the abnormal status comprises at least one of the path of the user being deviated from a designed path, the location of the user being deviated from a designed location, the moving speed of the user being overly slow, the moving speed of the user being overly fast, the dwelling time of the user being overly long, a sudden change of the heart rate of the user, a sudden change of the body motion of the user, abnormal content in the video recording of the user, abnormal content in the audio recording of the user, abnormal content in the message by the user, an overly long response time of the user, an abnormal presence of an inmate, an identity mismatch of the inmate, an abnormal location of the inmate, an overly fast moving speed of the inmate, an unknown wireless communication signal, and a forbidden wireless communication signal.

5. The multi-functional device according to claim 4, wherein the action comprises at least one of sending an alert to the user, enabling video recording, enabling image recording, enabling video streaming, sharing the location of the user, sending an alert to other users, sharing the location of the inmate with the other users, and sharing the location of the wireless signal with other users.

6. The multi-functional device according to claim 1, wherein the processor is further configured to record the real-time status and analyze the real-time status.

7. The multi-functional device according to claim 1, wherein the at least one positioning signal comprises at least one of an indoor positioning signal.

8. The multi-functional device according to claim 7, wherein the indoor positioning signal includes at least one of a radio frequency signal, a Bluetooth signal, a WiFi signal, and an ultrasonic signal.

9. The multi-functional device according to claim 1, wherein the processor is further configured to: authenticate an identity of the user; and execute a voice command of the user.

10. The multi-functional device according to claim 7, wherein the positioning data comprises reference positioning data for determining the location of the user, and the monitoring data comprises criteria for determining the real-time status of the user.

11. A method for positioning and monitoring a user, the method comprising:
   receiving at least one positioning signal from a communication network;
   receiving at least one piece of status data;

determining a location of the user based on the at least one positioning signal and positioning data;

determining whether a real-time status of the user is an abnormal status based on at least one of the positioning data, the at least one positioning signal, the at least one piece of status data, and monitoring data; and in response to the real-time status being an abnormal status, automatically performing a real-time monitoring process based on the location of the user, wherein the abnormal status comprises a contraband wireless signal in a detectable frequency range.

12. The method according to claim 11, wherein the real-time status comprises at least one of a path of the user, the location of the user, a moving speed of the user, a dwelling time of the user, a heart rate of the user, a body motion of the user, a video recording of the user, an audio recording of the user, a message by the user, and a response time of the user, a presence of an inmate, an identity of the inmate, a location of the inmate, a moving speed of the inmate, a frequency of a wireless communication signal, and a location of the wireless signal.

13. The method according to claim 12, wherein the abnormal status comprises at least one of the path of the user being deviated from a designed path, the location of the user being deviated from a designed location, the moving speed of the user being overly slow, the moving speed of the user being overly fast, the dwelling time of the user being overly long, a sudden change of the heart rate of the user, a sudden change of the body motion of the user, abnormal content in the video recording of the user, abnormal content in the audio recording of the user, abnormal content in the message by the user, an overly long response time of the user, an abnormal presence of an inmate, an identity mismatch of the inmate, an abnormal location of the inmate, an overly fast moving speed of the inmate, an unknown wireless communication signal, and a forbidden wireless communication signal.

14. The method according to claim 1, wherein the real-time monitoring process comprises streaming at least one of an image or a video.

15. The method according to claim 14, wherein the abnormal status comprises at least one of a movement of the user or a heartrate of the user.

16. The method according to claim 11, wherein the abnormal status comprises at least one of a presence, an identity, a location, a number, or a moving speed of humans in a detectable distance range.

17. The method according to claim 1, wherein the processor is further configured to parse a message of the user.

* * * * *